(12) United States Patent
Coffman et al.

(10) Patent No.: US 12,509,655 B2
(45) Date of Patent: Dec. 30, 2025

(54) INTEGRATED AND CONTINUOUS RECOMBINANT PROTEIN MANUFACTURING

(71) Applicant: Boehringer Ingelheim International GmbH, Ingelheim am Rhein (DE)

(72) Inventors: Jonathan Coffman, Gaithersbury, MD (US); Scott A. Godfrey, Pleasanton, CA (US); Raquel Orozco, Richmond, CA (US); Robert Lee Fahrner, Ellisville, MO (US); Marcus Andre Fiadeiro, Cambridge, MA (US); Robert E. Kottmeier, St. Louis, MO (US); Joseph K. Mclaughlin, Ballwin, MO (US); Jeffrey Richard Salm, Wakefield, MA (US)

(73) Assignee: Boehringer Ingelheim International GmbH, Ingelheim am Rhein (DE)

( * ) Notice: Subject to any disclaimer, the term of this patent is extended or adjusted under 35 U.S.C. 154(b) by 969 days.

(21) Appl. No.: 17/599,050

(22) PCT Filed: Mar. 27, 2020

(86) PCT No.: PCT/US2020/025334
§ 371 (c)(1),
(2) Date: Sep. 28, 2021

(87) PCT Pub. No.: WO2020/205559
PCT Pub. Date: Oct. 8, 2020

(65) Prior Publication Data
US 2022/0162535 A1  May 26, 2022

Related U.S. Application Data

(60) Provisional application No. 62/899,829, filed on Sep. 13, 2019, provisional application No. 62/827,504, filed on Apr. 1, 2019.

(51) Int. Cl.
*C12M 1/00* (2006.01)
*C12M 1/26* (2006.01)

(52) U.S. Cl.
CPC ............ *C12M 23/28* (2013.01); *C12M 33/14* (2013.01); *C12M 47/10* (2013.01); *C12M 47/12* (2013.01)

(58) Field of Classification Search
CPC ...... C12M 23/28; C12M 33/14; C12M 47/10; C12M 47/12; C12M 29/00; C12M 47/16; C12M 41/48
See application file for complete search history.

(56) References Cited

U.S. PATENT DOCUMENTS 11,104,875 B2  8/2021  Hiller et al.
2014/0255994 A1  9/2014  Konstantinov et al.
(Continued)

FOREIGN PATENT DOCUMENTS

EP  2682168 A1  1/2014
JP  2011215008 A  10/2011
(Continued)

OTHER PUBLICATIONS

International Search Report and Written Opinion for corresponding application, PCT/US2020/025334, date of mailing Jul. 2, 2020.

*Primary Examiner* — Liban M Hassan
(74) *Attorney, Agent, or Firm* — Mary Breen Smith

(57) ABSTRACT

Integrated systems and methods for the manufacturing of recombinant proteins in mammalian cells are provided. The systems and methods include a single-use bioreactor (SUB), a tangential flow filtration system, a column chromatography skid, a tankless hold, a virus inactivation plug flow reactor, and pumps.

2 Claims, 9 Drawing Sheets

(56) References Cited

U.S. PATENT DOCUMENTS

| | | | |
|---|---|---|---|
| 2015/0064769 A1* | 3/2015 | Xenopoulos | C12N 7/00 |
| | | | 435/238 |
| 2015/0158907 A1 | 6/2015 | Zhou et al. | |
| 2017/0320909 A1 | 11/2017 | Xenopoulos et al. | |
| 2019/0275519 A1 | 9/2019 | Castillo et al. | |

FOREIGN PATENT DOCUMENTS

| | | | | |
|---|---|---|---|---|
| WO | 2001060974 A2 | 8/2001 | | |
| WO | 2006056469 A1 | 6/2006 | | |
| WO | 2013116421 A1 | 8/2013 | | |
| WO | 2014004281 A1 | 1/2014 | | |
| WO | 2015039115 A1 | 3/2015 | | |
| WO | WO-2018035116 A1 * | 2/2018 | ......... | B01D 15/1864 |

* cited by examiner

INTEGRATED AND CONTINUOUS RECOMBINANT PROTEIN MANUFACTURING

FIELD OF THE SUBJECT TECHNOLOGY

The subject technology relates to methods of protein production in cultured animal cells, preferably mammalian cells, using a continuous cell-culture system and method.

BACKGROUND OF THE SUBJECT TECHNOLOGY

The current continuous cell-culture systems and methods (including perfusion or fed-batch bioreactors) suffer from many disadvantages, including a lack of scalability and low production yield. Therefore, there is a need for an alternative continuous cell-culture system or method that overcomes these limitations.

SUMMARY OF THE SUBJECT TECHNOLOGY

The goal of this subject technology is to overcome the current limitations of continuous cell-culture systems and methods.

One or more aspects of the present invention are described as numbered clauses (e.g., 1, 2, 3, etc), below for convenience. These clauses are provided as examples and not as limitations of the subject technology. Any dependent clause below may be included (by any combination), and placed into a respective independent clause, such as clause 1 from which clause 2 depends. The other clauses can be presented in a similar manner.

1. An integrated system for manufacturing a recombinant protein product, said system including a single-use bioreactor (SUB), a tangential flow filtration system, a column chromatography skid, a tankless hold, a virus inactivation plug flow reactor, and pumps.
2. The integrated system of clause 1, wherein system is automated, continuous and/or single-use.
3. The integrated system of clause 1, wherein each of the SUB, the tangential flow filtration system, the column chromatography skid, the tankless hold, the virus inactivation plug flow reactor and the pumps is single-use.
4. The integrated system of clause 1, wherein the SUB includes a perfusion bioreactor with a volume of about 10 L to about 2250 L.
5. The integrated system of clause 1, wherein the SUB includes a fed-batch bioreactor with a volume of about 2 L to about 4500 L.
6. The integrated system of clause 5, wherein the SUB is fluidically connected, without a tank and by tubing, to the tangential flow filtration system generating permeate.
7. The integrated system of clause 6, wherein the permeate is transferred by an about ¼ inch to about ⅜ inch (or about 6 mm to about 10 mm) single-use tubing directly to the column chromatography skid without a tank.
8. The integrated system of clause 7, wherein the permeate is cooled to room temperature using a heat exchanger.
9. The integrated system of clause 1, wherein the column chromatography skid includes a dual-column capture chromatography, each generating effluent.
10. The integrated system of clause 9, wherein the first or capture column is a Protein A column.
11. The integrated system of clause 9, wherein the second column is an anion exchange column.
12. The integrated system of clause 9, wherein the column chromatography skid is fluidically connected, without a tank and by tubing, to the tankless hold.
13. The integrated system of clause 9, wherein the effluent is transferred by an about ¼ inch to about ⅜ inch (or about 6 mm to about 10 mm) single-use tubing to the tankless hold.
14. The integrated system of clause 1, wherein the tankless hold is fluidically connected to the virus inactivation plug flow reactor (e.g., in serpentine or knot design forms as described in co-pending patent applications Nos. 62/742,530 and/or 62/742,534 filed on Oct. 8, 2018, the entire content of each of which is hereby incorporated herein by reference).
15. The integrated system of clause 1, wherein the pumps are fluidically connected to the SUB, tangential flow filtration system, column chromatography skid, tankless hold, and/or the virus inactivation plug flow reactor.
16. The integrated system of clause 1, wherein the pumps comprise a first set of pumps and a second set of pumps.
17. The integrated system of clause 16, wherein the first set of pumps operate with a range of about 60 mL/min to about 5 L/min or about 60 mL/min to about 600 mL/min.
18. The integrated system of clause 16, wherein the second set of pumps operate with a range of about 125 mL/min to about 2.5 L/min.
19. The integrated system of clause 1, wherein the system is capable of processing between 10 g and 5,000 g of recombinant Protein per day.
20. An automated integrated single-use continuous cell culture system including:
    a. a single-use bioreactor (SUB) between 10 L and 2250 L,
    b. a single-use tangential flow filtration system generating a permeate,
    c. a single-use dual-column capture column chromatography skid generating an effluent;
    d. a tankless hold and
    e. a single-use virus inactivation plug flow reactor; and
    f. a first set of pumps operating with a range of about 60 mL/min to about 5 L/min, or about 60 mL/min to about 600 mL/min and a second set of pumps operating with a range of about 125 mL/min to about 2.5 L/min;
    wherein the single-use SUB is fluidically attached, without a tank and by tubing, to the single-use tangential flow filtration system; wherein the permeate is transferred, without a tank, by an about ¼ inch to about ⅜ inch (or about 6 mm to about 10 mm) single-use tubing to the single-use dual-column capture column chromatography skid; wherein the effluent is transferred, without a tank, by an about ¼ inch to about ⅜ inch (or about 6 mm to about 10 mm) single-use tubing to the tankless hold; wherein the tankless hold is fluidically connected to the single-use virus inactivation plug flow reactor; wherein the first and second sets of pumps are fluidically connected to one or more of components a-e.
21. The automated integrated single-use continuous cell culture system of clause 20, wherein the system is capable of processing between 10 g and 5,000 g of recombinant protein per day.

22. The automated integrated single-use continuous cell culture system of clause 20, wherein the SUB is a perfusion bioreactor or a fed-batch bioreactor.
23. A lab-scale automated integrated single-use continuous cell culture system, including:
   a. a single-use bioreactor (SUB) between 10 L and 2250 L,
   b. a single-use tangential flow filtration system generating a permeate,
   c. a single-use dual-column capture column chromatography skid generating an effluent;
   d. a tankless hold and
   e. a single-use virus inactivation plug flow reactor; and
   f. a first set of pumps operating with a range of about 0.060 mL/min to about 5 mL/min, or about 0.060 mL/min to about 0.6600 mL/min and a second set of pumps operating with a range of about 0.125 mL/min to about 2.5 mL/min.
24. The lab-scale automated integrated single-use continuous cell culture system of clause 23, wherein the single-use SUB is fluidically attached, without a tank and by tubing, to the single-use tangential flow filtration system; wherein the permeate is transferred, without a tank, by about 0.012 into about 0.036-inch (or about 0.3 to about 1 mm) single-use tubing to the single-use dual-column capture column chromatography skid.
25. The lab-scale automated integrated single-use continuous cell culture system of clause 24, wherein the effluent is transferred, without a tank, by single-use 0.012 into 0.036 inch (or about 0.3 to about 1 mm) tubing to the tankless hold; wherein the tankless hold is fluidically connected to the single-use virus inactivation plug flow reactor.
26. The lab-scale automated integrated single-use continuous cell culture system of clause 25, wherein the first and second sets of pumps are fluidically connected to one or more of components a-e.
27. The lab-scale automated integrated single-use continuous cell culture system of clause 23, wherein the SUB is a perfusion bioreactor or fed-batch bioreactor.
28. A lab-scale automated integrated single-use continuous cell culture system including:
   a. a single-use bioreactor (SUB) between 10 L and 2250 L,
   b. a single-use tangential flow filtration system generating a permeate,
   c. a single-use dual-column capture column chromatography skid generating an effluent;
   d. a tankless hold and
   e. a single-use virus inactivation plug flow reactor; and
   f. a first set of pumps operating with a range of about 0.060 mL/min to about 5 mL/min, or about 0.060 mL/min to about 0.6600 mL/min and a second set of pumps operating with a range of about 0.125 mL/min to about 2.5 mL/min;
   wherein the single-use SUB is fluidically attached, without a tank and by tubing, to the single-use tangential flow filtration system; wherein the permeate is transferred, without a tank, by about 0.012 into about 0.036 inch (or about 0.3 to about 1 mm) single-use tubing to the single-use dual-column capture column chromatography skid; wherein the effluent is transferred, without a tank, by single-use 0.012 into 0.036 inch (or about 0.3 to about 1 mm) tubing to the tankless hold; wherein the tankless hold is fluidically connected to the single-use virus inactivation plug flow reactor; wherein the first and second sets of pumps are fluidically connected to one or more of components a-e.
29. The lab-scale automated integrated single-use continuous cell culture system of clause 28, wherein the SUB is a perfusion bioreactor or a fed-batch bioreactor.
30. The integrated system according to any of the preceding clauses, wherein the system is mounted on wheels.
31. The integrated system according to any of the preceding clauses, wherein the systems makes about 5 to about 60 kg of recombinant Protein in about 10 to 20 days.

Additional features and advantages of the subject technology will be outlined in the description below will be apparent from the description or learned by practice of the subject technology. The advantages of the subject technology are presently described and embodiments may be envisioned by a person of skill in the art of the technology as particularly pointed out in the written description and claims hereof and as described in the appended drawings.

The foregoing general description and the following detailed description are exemplary and explanatory and are intended to provide further explanation of the subject technology as claimed.

BRIEF DESCRIPTION OF THE DRAWINGS

These and other features, aspects, and advantages of the claimed methods, apparatuses, and systems are better understood when the following detailed description is read with reference to the accompanying drawings:

DETAILED DESCRIPTION OF THE SUBJECT TECHNOLOGY

Figure 1:
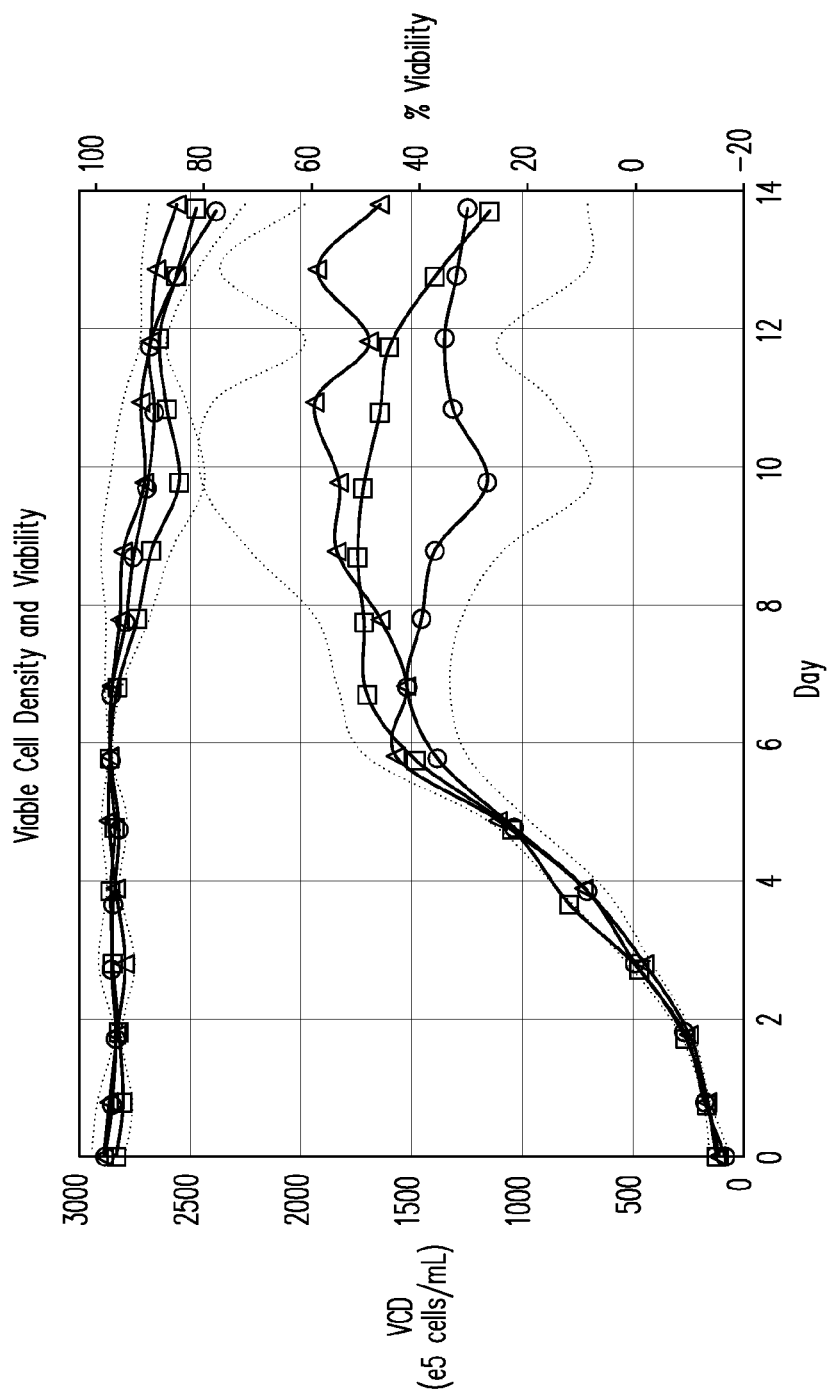
FIG. 1 shows viable cell density (solid lines, primary y-axis) and viability (dashed lines, secondary y-axis) for three pilot-scale iSkid runs: 1 (Δ), 2 (□), and 3 (○). All runs performed at 100 L running a mammalian cell line expressing a recombinant monoclonal antibody over 14 days. Dotted lines represent +/−3 standard deviations.

Without wishing to be bound by any theory, the present invention is in part based on the surprising finding that the automated recombinant manufacturing system of the subject technology with a specific set of single-use pump sizes, tubing sizes, and column sizes, and the use of a single-use reactor ("Tankless Hold"), a single-use buffer concentrates dilution system and no surge tanks between the unit operations will have a 500-fold dynamic range. The current perfusion systems have only a 10-20 dynamic range.

In one aspect, the subject technology relates to an automated integrated single-use system controlling a single-use perfusion or fed-batch bioreactor (SUB) between 10 L and 2250 L attached by tubing to a single-use tangential flow filtration system, the permeate of which is directly attached by ¼ inch to ⅜ inch single-use tubing to a single-use dual-column capture chromatography skid, the product effluent of which is attached without a tank by single-use ¼ inch to ⅜ inch tubing to a tankless hold and a single-use virus inactivation plug flow reactor, the product effluent of which is attached by ¼ inch to ⅜ inch (or about 6 mm to about 10 mm in diameter) tubing to a flow-through chromatographic step. The system uses a single-use buffer supply delivery system with a set of single-use pumps with a range of 60 mL/min to 600 mL/min and a set of pumps with a range of 125 mL/min to 2.5 L/min that is capable of processing between 10 g and 5,000 g of recombinant protein per day. As used herein, the term "tank" refers to a vessel that is capable of holding and mixing liquid and has an air-liquid interface during use.

In one embodiment, the SUB equipment can be changed to another SUB of different volume between 10 and 2250 L without an other equipment change to the rest of the skid. The SUB equipment is defined as the durable components, which include the SUB shell, the mass flow controllers for O2, CO2, and air, the recirculation pump, and the permeate pump. The single-use assemblies, such as the chromatography columns, any product contact material, the flow meter, will change size depending upon the mass and volume of material to be processed. For instance, a 100 L SUB could typically require dual 1 L capture columns and between about 1.1 and about 3 L tankless hold, while a 2000 L SUB would require dual 13 L capture columns, and between about 14 L and about 39 L tankless hold.

In another embodiment, the tankless hold has a volume of 1.1 to 3 times the affinity column volume.

In another embodiment, the buffer supply system and associated valves and pumps that allow the dilution of buffer solutions from a buffer concentrate of five times the process buffer concentration, and capable of processing of small amounts (50 g) to large amounts (5 kg) per day without loss of efficiency or material.

In another embodiment, a single-use heat exchanger is placed in the permeate line between the TFF and the dual capture columns. The heat exchanger is sized such that it is capable of reducing the temperature of the permeate from approximately 37° C. to 20-25° C. The size of the heat exchanger depends upon the flow rate and is obvious to those skilled in the art.

In another embodiment, the solution supply to capture step includes two pumps, one of which is attached to one water/diluent line, and the other pump to 3 to 8 buffer concentrates, one of which contains sanitization fluid.

In another embodiment, the solution supply to polishing step includes two pumps, one of which is attached to one water/diluent line, and the other pump is attached to 3 to 9 buffer concentrates, one of which is attached to one water/diluent line, and the other to 3 to 8 buffer concentrates, one of which contains sanitization fluid.

In another embodiment, the solution supply to virus inactivation step contains two buffer lines and at least one line for sanitization.

In another embodiment, the solution supply to SPTFF has one pump, and one to two buffer concentrates, and one line for sanitization.

In another embodiment, the pump characteristic includes single-use pumps capable of flow rates between 100 mL/min and 10 L/min. A single pump is typically able to operate accurately over a range of about 20×, from 5% of maximum pump capacity to 95% of maximum pump capacity. Thus, a pump with a capacity of 0 LPM to 10 LPM can operate accurately between about 0.5 LPM and 9.5 LPM. A pump can operate even more accurately between 10% and 90% of the maximum pump capacity, a range of about 10×. The use of buffer concentrates means that the most accurate pumps must be the buffer concentrate pumps, which should remain within a 10-90% of maximum pump capacity. A 5% difference in a 5× buffer concentrate flow rate results in a buffer that is 20% different than intended, which is typically too large for most bioprocesses.

In another embodiment, each pair of pumps has the buffer concentrate pump with a range of 60 mL/min to 600 mL/min (ideally for buffer concentrates) and another set of pumps of 125 mL/min to 2.5 L/min, primarily for diluent.

In another embodiment, at smaller scales, the buffers could be made at 1×. At smaller scales, a 1× solution is used, and only the buffer pumps are used. Those skilled in the art recognize these pump sizes as preferred. The pump for the buffer concentrate and the diluent can have the same capacity, with only a marginal impact on the total dynamic range of capacities.

Table 1 below shows the range of capabilities of a described based on the parameters listed in Table 2. The minimum practical daily mass is higher than the Minimum Daily Mass due to considerations of the column volume compared to the tubing. In this case, the column volume is only about 6× that of the tubing volume (1 m of tubing as an example). This extra column volume would cause significant dilution of the product in the iskid, and may lead to yield loss.

TABLE 1

| Minimum Bioreactor Size (approx) | Max Perfusion Bioreactor | Max Fed-Batch Bioreactor | Minimum daily mass | Max Daily Mass | Min Column Size | Max Column Volume |
|---|---|---|---|---|---|---|
| 10 mL | 2 L | 5 L | 0.05 g | 5 g | 0.25 mL | 13 mL |
| 10.0 L | 2250 L | 4500 L | 50 g | 5 kg | 250 mL | 13 L |

TABLE 1-continued

| Buff Pump Lower Limit | Buff Pump Upper Limit | Diluent Pump Lower Limit | Diluent Pump Upper Limit | Min Tubing size | Max Tubing Size |
|---|---|---|---|---|---|
| 0.06 mL/min | 0.63 mL/min | 0.13 mL/min | 2.50 mL/min | 0.012 in (300 um) | 0.036 in (910 um) |
| 0.063 L/min | 0.63 L/min | 0.125 L/min | 2.5 L/min | 0.25 in | 0.75 in |

TABLE 2

| Assumptions/Parameters | |
|---|---|
| Minimum Capture step Capacity | 20 g/L resin |
| Maximum Capture Step Capacity | 50 g/L resin |
| Min cycles/day | 2 |
| Max cycles/day | 8 |
| Column Residence Time | 4 Min |
| Max flowrate in ¼ in tubing | 3.13 L/min |
| Maximum Buffer Concentrate | 5x over process concentrate |

Various other examples or embodiments relating to one or more aspects of the present invention are described as numbered clauses (1, 2, 3, etc.) below for convenience. These are provided as examples and do not limit the subject technology. As previously noted, any of the dependent clauses may be combined in any combination, and placed into a respective independent clause, e.g., clause 1. The other clauses can be presented in a similar manner.

1. An automated integrated single-use system controlling a single-use perfusion bioreactor (SUB) between 10 L and 2250 L attached by tubing to a single-use tangential flow filtration system, the permeate of which is attached without a tank by ¼ inch to ⅜ inch single-use tubing to a single-use dual-column capture chromatography skid, the product effluent of which is attached without a tank by single-use ¼ inch to ⅜ inch tubing to a tankless hold and a single-use virus inactivation plug flow reactor, with sets of single-use pumps with a range of 60 mL/min to 5 L/min, or preferably 60 mL/min to 600 mL/min and a set of pumps with a range of 125 mL/min to 2.5 L/min.
2. The integrated system of clause 1, and the product effluent of which is attached by ¼ inch to ⅜ inch tubing to a chromatographic step.
3. The integrated system of clause 1 or 2 and the system a single-use buffer supply delivery system with a set of single-use pumps with a range of 60 mL/min to 600 mL/min and a set of pumps with a range of 125 mL/min to 2.5 L/min that is capable of processing between 10 g and 5,000 g of recombinant protein per day.
4. The integrated system wherein the capture column is a Protein A column.
5. The integrated system where the second column is an anion exchange column.
6. An automated integrated single-use system controlling a single-use fed-batch bioreactor (SUB) between 2 L and 4500 L attached to a cell removal device, the effluent of which is attached by ¼ inch to ⅜ inch single-use tubing to a single-use dual-column capture chromatography skid, the product effluent of which is attached without a tank by single-use ¼ inch to ⅜ inch tubing to a tankless hold and a single-use virus inactivation plug flow reactor, the product effluent of which is attached by ¼ inch to ⅜ inch tubing to a chromatographic step. The system uses a single-use buffer supply delivery system with a set of single-use pumps with a range of 60 mL/min to 600 mL/min and a set of pumps with a range of 125 mL/min to 2.5 L/min that is capable of processing between 10 g and 5,000 g of recombinant Protein per day.
7. A lab-scale automated integrated single-use system controlling a single-use perfusion bioreactor (SUB) between 10 mL and 2250 mL attached by tubing to a single-use tangential flow filtration system, the permeate of which is attached without a tank by 0.012 into 0.036-inch single-use tubing to a single-use dual-column capture chromatography skid, the product effluent of which is attached without a tank by single-use 0.012 into 0.036-inch tubing to a tankless hold, with sets of single-use pumps with a range of 0.060 mL/min to 5 mL/min, or preferably 0.060 mL/min to 0.6600 mL/min and a set of pumps with a range of 0.125 mL/min to 2.5 mL/min.
8. The integrated lab-scale system of Clause 7 with a single-use virus inactivation plug flow reactor
9. The integrated system of clause 7, and the product effluent of which is attached by 0.012 into 0.036-inch tubing to a chromatographic step.
10. The integrated system of Clause 7 or 8 or 9 and the system a single-use buffer supply delivery system with a set of single-use pumps with a range of 0.06 mL/min to 0.600 mL/min and a set of pumps with a range of 0.125 mL/min to 2.5 mL/min that is capable of processing between 10 mg and 5,000 mg of recombinant Protein per day.
11. The integrated system of clauses 1-6 mounted on wheels.
12. A method, whereby the integrated skid system from clauses 1-7 makes 5, 10, 15, 20, 30, 40 60 kg of antibody compounds in 10, 14, 20 days.
13. The use of the skid device/system above to make 5, 10, 15, 20, 30, 40 60 kg of recombinant Protein in 10, 14, 20 days.
14. The use of 5× buffer concentrates in single-use vessels.
15. The use of 10× buffer concentrates in single-use vessels.
16. The use of portable bioreactors with various volumes that can be plugged into the system (for example, 100 L, 500 L, 1000 L, or 2000 L single-use bioreactors).
17. The use of sanitization solution (such as 0.5M NaOH for 15 minutes) two times per day in the capture step, the plug flow reactor, and the polishing step

EXAMPLES

Example 1

An Automated Single-Use System

An automated single-use system controlled a 100 L single-use perfusion bioreactor (SUB) attached by ¾ inch tubing to a single-use tangential flow filtration system with a recirculation pump (Levitronics Pump and Spectrum 0.2 um TFF filter), and a permeate pump (Quatroflo 150).

The permeate was attached by ¼ inch single-use tubing to a single-use dual-column 1 L MabSelect Sure LX Protein A (GE Healthcare) column on a chromatography skid or capture step. Each column operation consisted of standard phases for Protein A steps, which are known to those skilled in the art that include a loading phase, three wash phases, an elution phase, a strip phase, a sanitization phase, an equilibration phase, and (optionally) a hold phase. The buffers and volumes used are shown in Table 2. The solutions were diluted from buffer concentrates by water. Table 2 below lists protein A buffers, volumes, and operating parameters. The concentration of the buffers is shown after dilution. The concentration of the buffers before dilution was five-fold higher, except for the Wash 2 solution, which was two-fold higher.

TABLE 2

| Step Description | Solution Description | CVs | Residence time (min) | Flow Rate (mL/min per 1 L CV) |
|---|---|---|---|---|
| Pre-Load Equilibration | 50 mM Tris, 150 mM NaCl, pH 7.5 | 5 | 5 | <251 |
| Load | Perfusion bioreactor permeate after passing through a 0.2 um filter | varies | ≥4 | ≤208 mL/min |
| Wash 1 | 50 mM Tris, 150 mM NaCl, pH 7.5 | 2 | 5 | ≤200 |
| Wash 2 | 50 mM Tris, 0.5M CaCl2, pH 7.5 | 5 | 4 | ≤250 |
| Wash 3 | 10 mM Tris, 10 mM NaCl, pH 7.5 | 3 | 4 | ≤250 |
| Elution | 25 mM Acetate, pH 3.50 ± 0.10 | 5 (Product elution is equivalent to 3 CVs - detailed in section 2.2.3) | 5 | ≤200 |
| Strip | 250 mM Acetate, 250 mM NaCl | 5 | 4 | ≤250 |
| Sanitization | 0.5M NaOH | 4 | 5 (15 to 20 minute total contact time) | ≤200 |
| Equilibration | 50 mM Tris, 150 mM NaCl, pH 7.5 | 3 | 5 | ≤200 |
| Hold | 50 mM Tris, 150 mM NaCl, pH 7.5 | 0 | n/a | 0 |

Each column of the dual column capture step is operated in parallel, with one loading, while the other one goes through the other phases.

The effluent of the elution phase was directed by means of valves and ¼ inch tubing to a 3 L tankless hold. The product effluent is held in the tankless hold until the plug flow reactor was ready to operate. The plug flow reactor was first primed with 50 mM glycine pH 3.3 to 3.5. When the plug flow reactor is ready, the product was pumped from the tankless hold at 50 mL/min into the plug flow reactor while simultaneously a stream of 2 M glycine pH 3.3 flowing at 7.5 mL/min was mixed with the product. The resulting product stream had a pH between 3.3 and 3.5. Once the product stream was completely removed from the tankless hold and contained in the plug flow reactor, the tankless hold effluent was switched to drain by valves. The tankless hold was then flushed and sanitized with a solution of 0.5M NaOH for 30 minutes. Simultaneously, a series of valves were switched, another pump was turned on and maintained the flow in the plug flow reactor at 50 mL/min by pumping 50 mM glycine pH 3.3 into the plug flow reactor, thus effecting the passage of the product through the plug flow reactor. When the UV signal on the effluent of the plug flow reactor rose above 100 mAU, the effluent was diverted from going to a sanitary drain and was directed to an anion exchange column through a ¼ inch tube while neutralization solution consisting of 315 mM Tris base was added to the PFR product effluent at a rate of 58 mL/min. The product stream passed through a static mixer before passing onto a 500 mL anion exchange column.

After the product stream had completely exited the plug flow reactor, the effluent from the plug flow reactor was directed to waste. The system was flushed with a sanitizing solution of 0.5M NaOH for at least 30 minutes before the next product cycle.

The anion exchange column was operated in a weak partitioning chromatographic mode familiar to those skilled in the art, such that the product mainly passes through the column during the load and subsequent wash step. The conditions of the anion exchange column are shown in Table 3. Table 3 lists anion exchange buffers, volumes, and operating parameters. The concentration of the buffers is shown after dilution. The concentration of the buffers before dilution was five-fold higher, except for the sanitization solution, which was two-fold higher.

TABLE 3

| Step Description | Solution Description | AEXCVs[1] | Residence time (minutes) | Flow rate (mL/min) |
|---|---|---|---|---|
| Equilibration | 50 mM Tris, pH 8.1 | 5 | 3.2 | 126 |
| Chase | 50 mM Tris, pH 8.1 | 3 | 3.2 | 126 |
| Sanitization (total sanitization time 30 min) | 0.5M NaOH, 2M NaCl | 5 | 8 | 67 |
| Equilibration | 50 mM Tris, pH 8.1 | 5 | 3.2 | 126 |

The product effluent from the anion exchange was directed to a single pass tangential flow (SPTFF) step through ¼ inch tubing. The SPTFF step concentrates the product using an ultrafiltration step familiar to those skilled in the art. The permeate flow rate from the SPTFF was about 58 mL/min, and the concentrated product was directed by valves to mix with 10% by volume, a 1M MES pH 6.0 solution. The mixture was then directed by valves through ¼ inch tubing into a 100 L single-use mixer or single-use tank. After the product stream passed through the SPTFF, the effluent of the SPTFF was diverted to waste, and the system flushed with a sanitizing solution of 0.5M NaOH for over 30 minutes.

Figure 2:
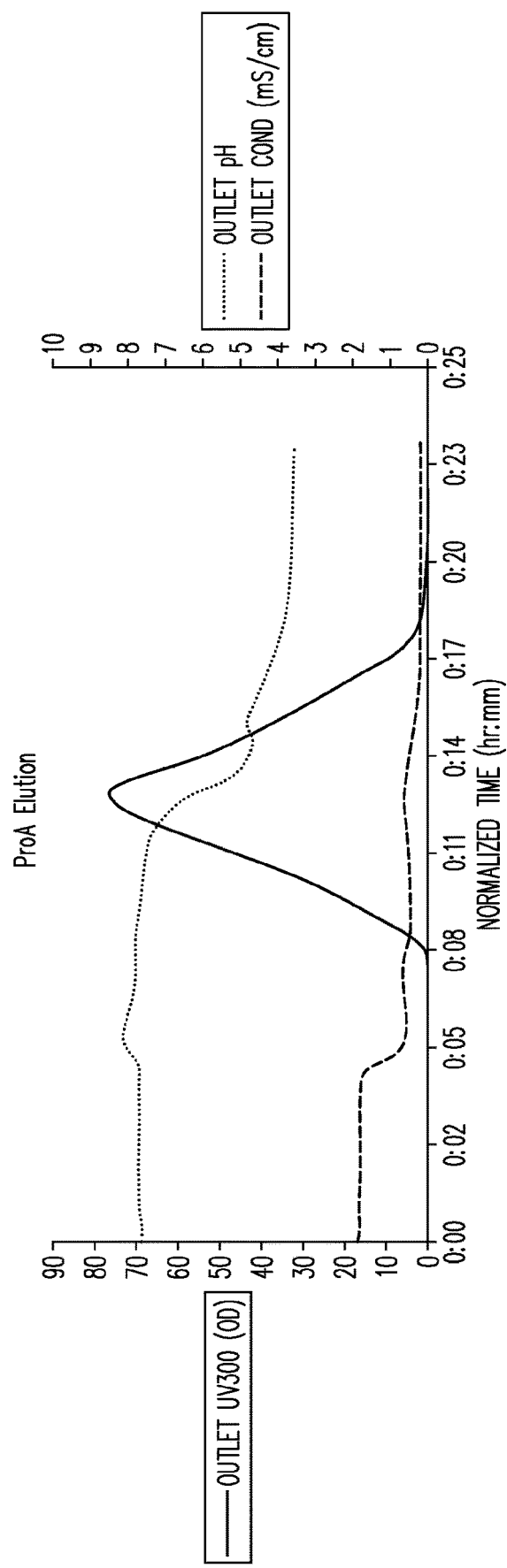
FIG. 2 illustrates a representative elution chromatogram for the Protein A step.
Figure 3:
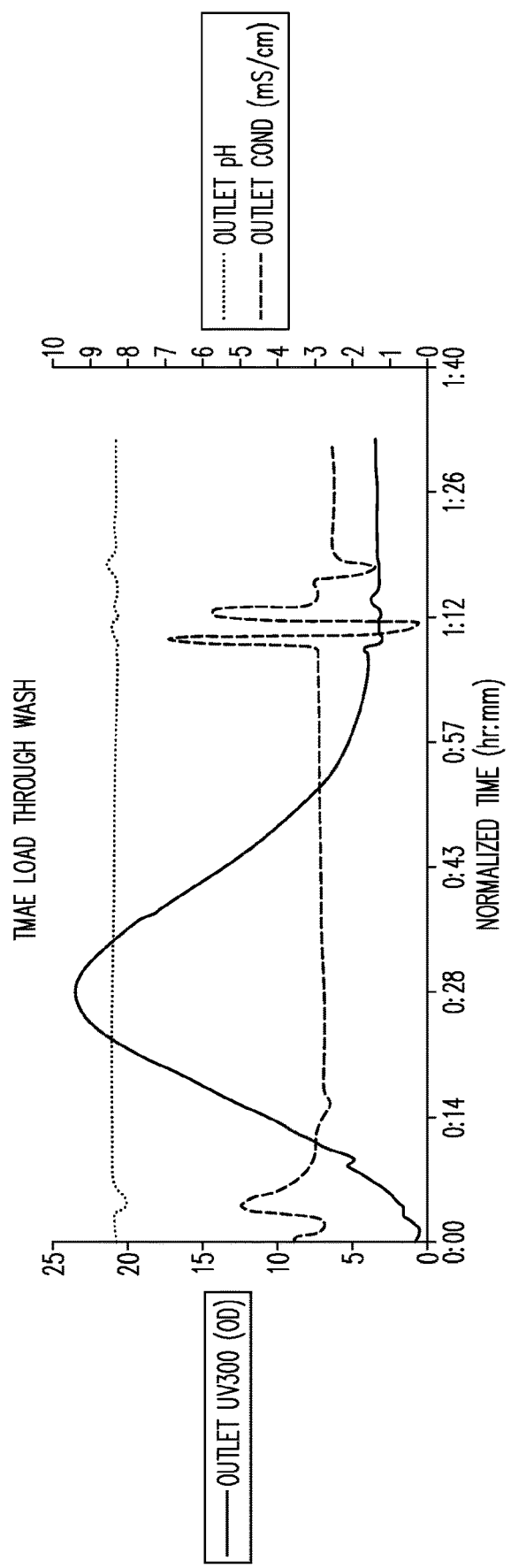
FIG. 3 shows a representative chromatogram for the Anion-Exchange step.
Figure 4:
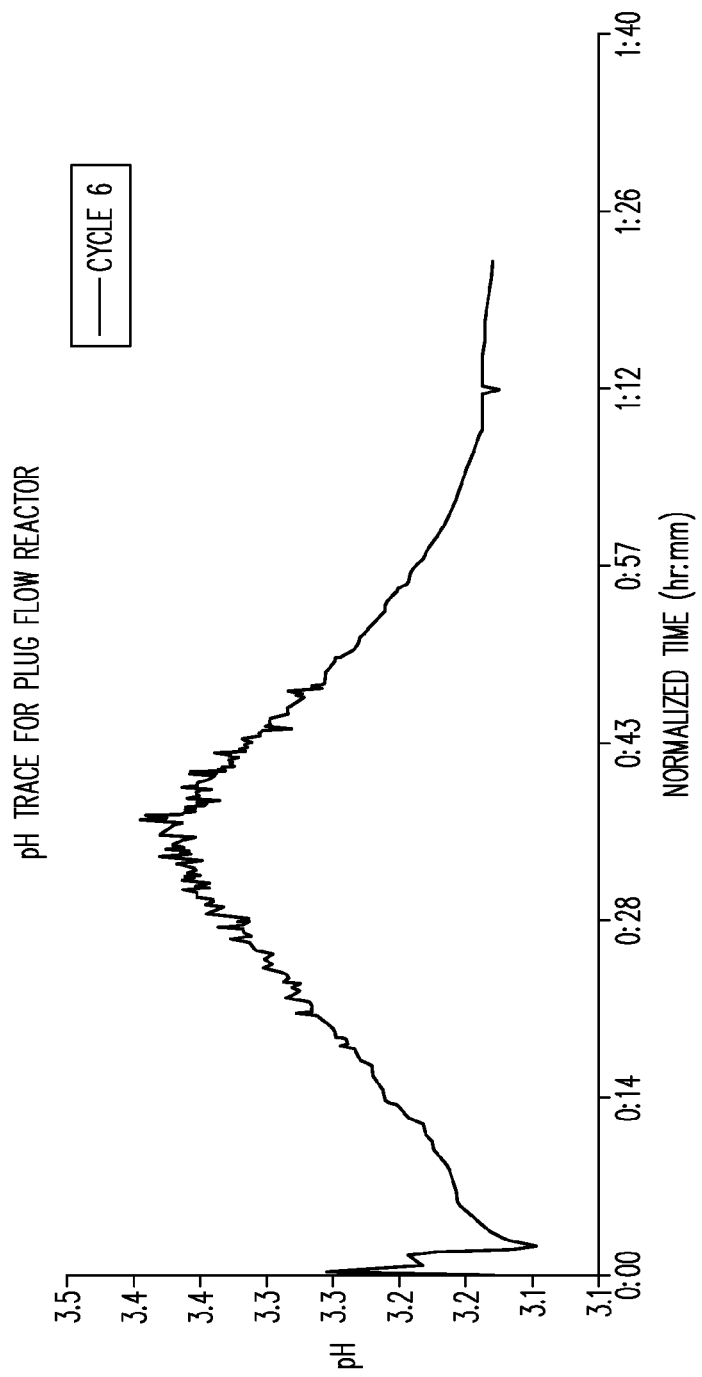
FIG. 4 shows a representative pH trace of material entering the plug flow reactor.

The system operated for 14 days and achieved a cell density of about 150 million cells per mL, as shown in FIG. 1. Representative chromatograms are shown for the Protein A step, FIG. 2, and the Anion Exchange step in FIG. 3. A representative pH trace of material entering and exiting the plug flow reactor is shown in FIG. 4.

Example 2

Process Summary

Figure 5:
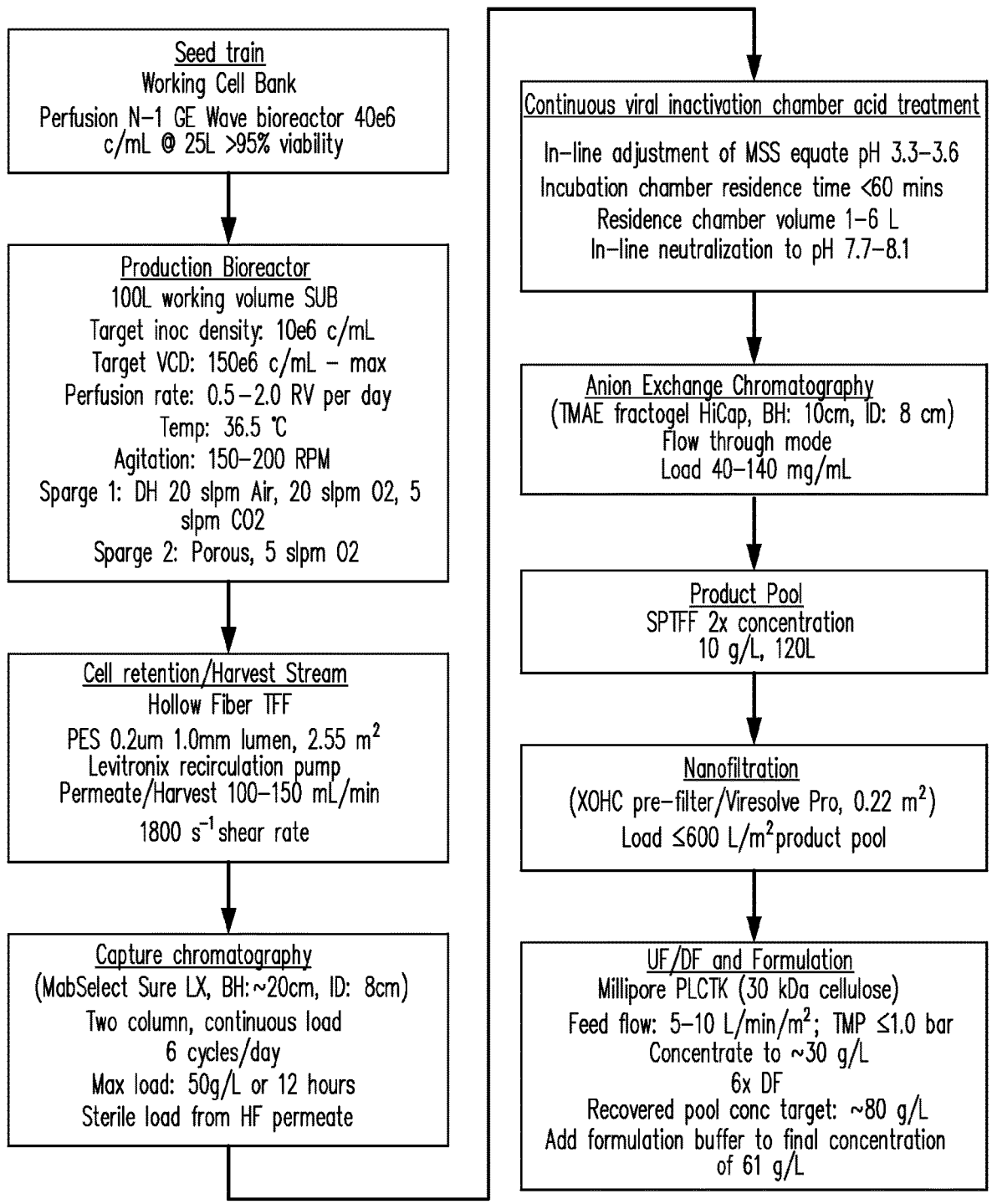
FIG. 5 shows the process flow.

The diagram shown in FIG. 5 describes the process for the production of >1000 g of formulated bulk drug substance utilizing the 100 L single-use perfusion bioreactor system. The current state of the technology requires that the seed train expansion process to be according to specific cell line requirements and will rely on existing fed-batch procedures.

Example 3

Purification Process Summary

Figure 6:
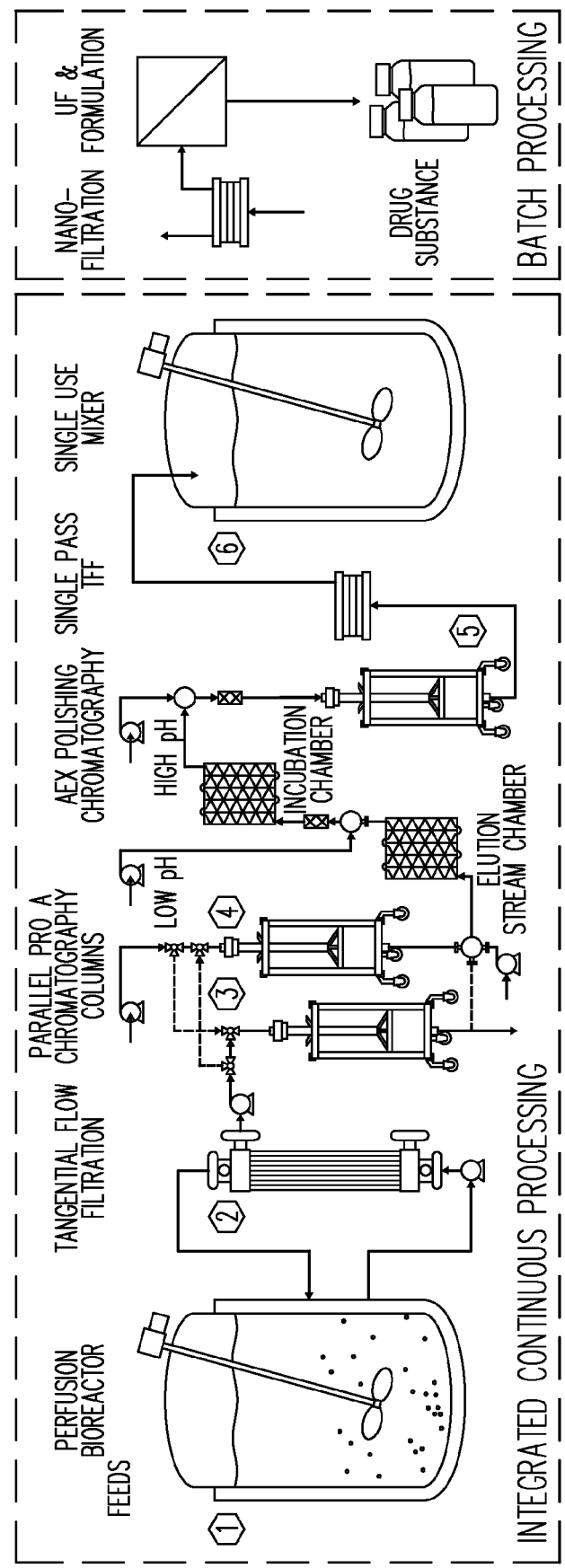
FIG. 6 shows a schematic of the design, including the plug flow reactor (labeled as an incubation chamber) and the tankless hold (labeled as Elution Stream Chamber). The Single-Pass Tangential Flow Filtration system is not discussed in the application.

The process described here is for the downstream processing of a mAb. The downstream process is designed for a continuous harvest stream productivity that ranges from 0.4-3.3 g/L/d or 0.8-6.6 g/L/d at a maximum flow rate of 3 bioreactor volumes per day. Downstream processing occurs from 8-13 days. See FIG. 6.

While in the current example a mixture of sodium and potassium carbonate added continuously were used to provide the upward pressure on pH that the consumption of lactic acid from the perfusion medium would have supplied if sodium-L-lactate were in the perfusion medium, presumably any appropriate non-toxic basic substance added in a continuous or semi-continuous manner to the culture could provide the same effect. Examples of such bases could include sodium or potassium hydroxide, among many others.

While the subject technology has been described in detail and with reference to specific embodiments thereof, it will be apparent to one of ordinary skill in the art that various changes and modifications can be made to the claimed invention without departing from the spirit and scope thereof. Thus, for example, those skilled in the art will recognize, or be able to ascertain, using no more than routine experimentation, numerous equivalents to the specific substances and procedures described herein. Such equivalents are considered to be within the scope of the subject technology and are covered by the claims.

Example 4

Summary of Product Quality Across Different mAbs

Extensive development and testing of the integrated system of the present invention for the manufacturing of a recombinant protein product, which we call iSKID™, has demonstrated that the technology is robust and reliable. The operation of pilot-scale prototype systems with 100-liter bioreactors have demonstrated consistent operational performance. The system has been tested using several cell lines and multiple production runs.

Our findings have shown that there are no differences in product quality for drug substances produced using the iSKID™ as compared to those produced using a conventional fed-batch process. As a demonstration of the capability of the iSKID™ to provide high-quality material, the data obtained from the prototype systems represents cell lines producing four monoclonal antibodies: STL-B, AND-T, BI-5, and BI-10. All molecules were manufactured using the iSKID™ systems without any specific product development. All materials or drug substances were generated in a non-GMP environment for information gathering only. A summary of the product quality data in drug bulk substance is shown in Table 4. The data shows that the product quality across products is appropriate for clinical use. Run to run (or batch to batch) consistency was demonstrated for the products that ran more than once in the iSKID™ under consistent conditions.

TABLE 4

| | | Molecule name | | | |
|---|---|---|---|---|---|
| | | STL-B | AND-T | BI-5 | BI-10 |
| | | Number of Runs | | | |
| | | 3 | 3 | 2** | 1 |
| Analytical Procedure | Quality Targets | Batch Results | Batch Results | Batch Results | Batch Results |
| Characteristics | | | | | |
| iCE | Report results | | | | |
| | % Main Peak (≥50.0%) | 61 ± 0.7% | 63 ± 5.4% | 45 ± 1.4% | 67.6% |
| | % Acidic Peaks (≤50.0%) | 16 ± 0.0% | 12 ± 2.6% | 10 ± 1.2% | 20.4% |
| | % Basic Peaks (≤45.0%) | 23 ± 0.6% | 25 ± 4.7% | 45 ± 1.8%* | 11.9% |
| Purity | | | | | |
| Size Exclusion HPLC | ≥95.0% monomer | 98.7 ± 0.6% | 96.5 ± 0.2% | 97.9 ± 0.5% | 99.0% |
| CGE (reducing) | ≥90.0% IgG as heavy + light chain | 99.2 ± 0.4% | 96.3 ± 0.6% | 98.3 ± 0.0% | 99.2% |
| Product-Related Impurities | | | | | |
| Size Exclusion HPLC | ≤5.0% HMMS | 0.9 ± 0.1% | 3.4 ± 0.3% | 2.0 ± 0.5% | 1.0% |
| CGE (reducing) | ≤6.0% (fragments) | 0.4 ± 0.2% | 1.6 ± 0.6% | 2.0 ± 0.0% | 0.8% |

TABLE 4-continued

| | | Molecule name | | | |
|---|---|---|---|---|---|
| | | STL-B | AND-T | BI-5 | BI-10 |
| | | Number of Runs | | | |
| | | 3 | 3 | 2** | 1 |
| Analytical Procedure | Quality Targets | Batch Results | Batch Results | Batch Results | Batch Results |
| Process-Related Impurities | | | | | |
| HCP ELISA | ≤100 ng/mg | <0.3 | ≤0.3 | <1 | <0.3 |

Figure 7:
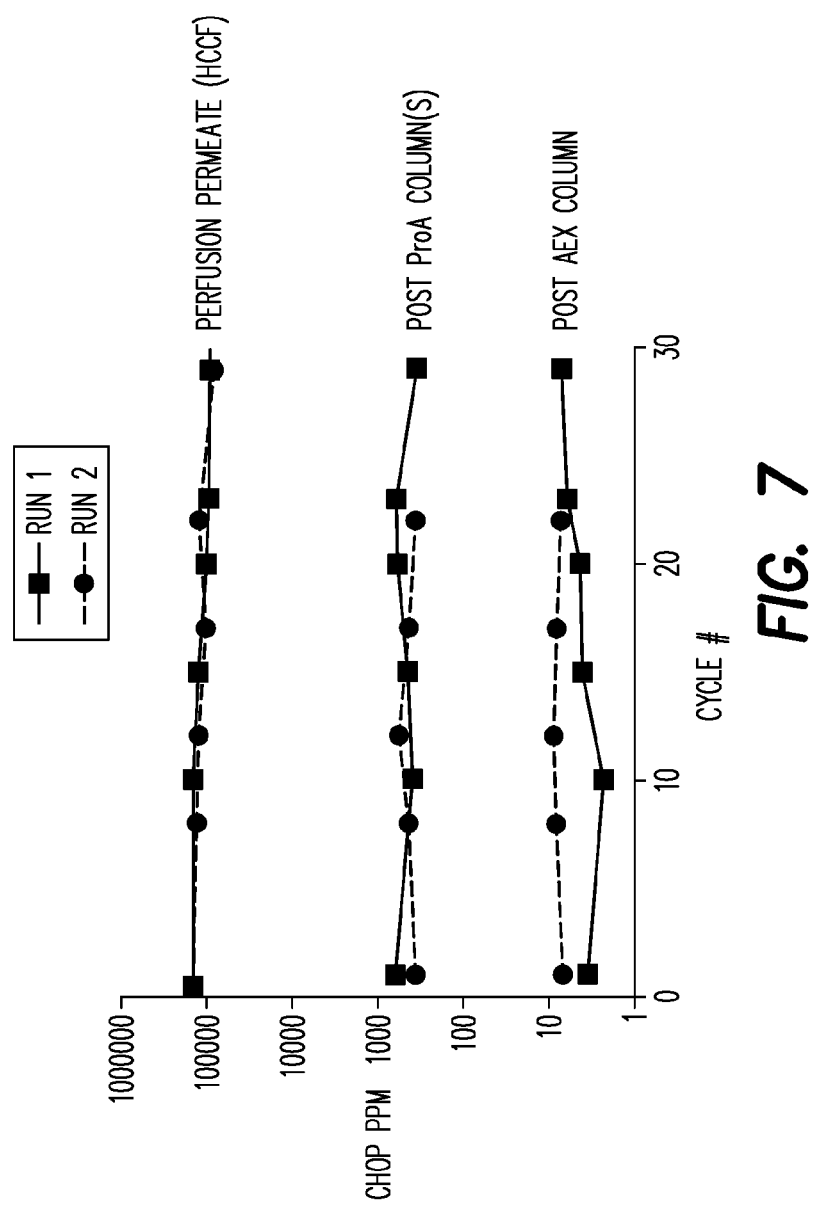
FIG. 7. Shows the host cell protein values for BI-5 runs 1 and 2 as a function of the ProA cycle number. The results are shown after three different unit operations: perfusion permeate, post ProA chromatography, and Post AEX chromatography. CHOP stands for Chinese hamster ovarian protein or host cell protein.
Figure 8:
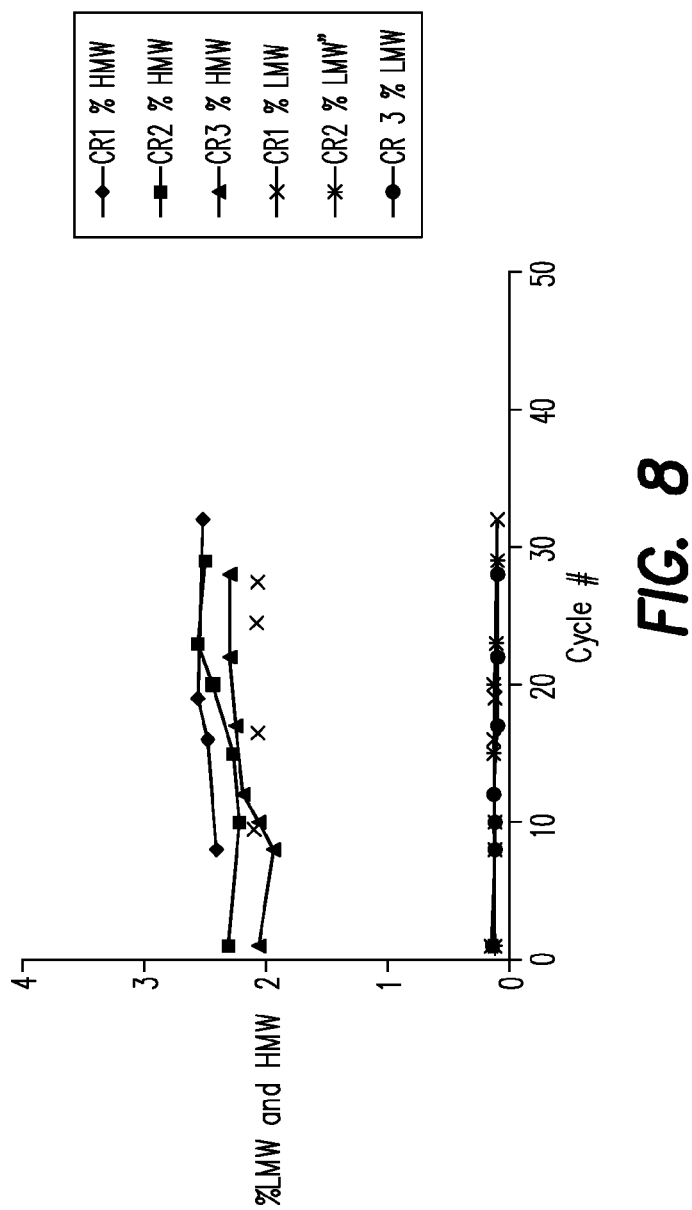
FIG. 8. Shows the low molecular weight (LMW) and high molecular weight (HMW) values for BI % as a function of cycle number. The samples were taken from the single-use mixer. CR stands for consistency run.

Abbreviations: iCE = Imaged Capillary Isoelectric Focusing; HMMS = High Molecular Mass Species; CGE = Capillary Gel Electrophoresis: HCP = Host Cell Protein; ELISA = Enzyme Linked Immunosorbent Assay; NMT = Not More Than
*Elevated species were fully characterized and assigned as non CQAs
**Pending results from consistency run 3 for BI-5
95% confidence intervals were used to determine batch ranges The product quality profiles at different stages of the periodic stage for selected attributes for the BI-5 molecule also illustrate consistency from run to run (FIG. 7, FIG. 8).

Example 5

Capabilities of the iSKID™ to Measure Yield

Figure 9:
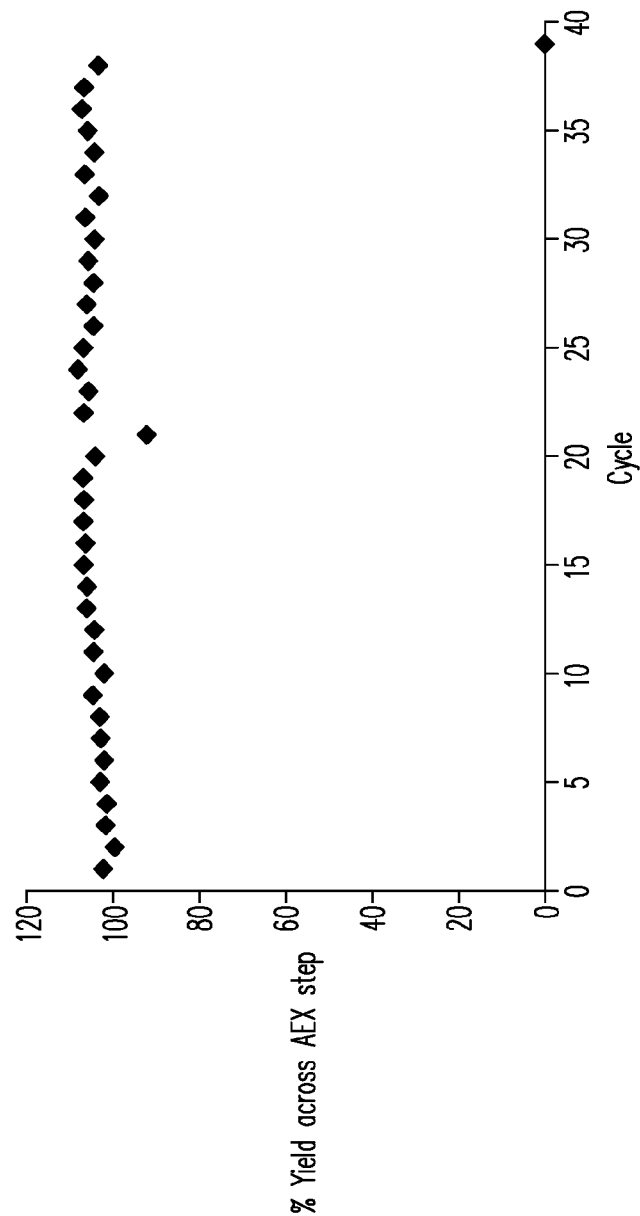
FIG. 9. Shows an example of the yield measurement for the Anion Exchange step demonstrated for a full run.

Because one central automation system is used in the iSKID™, it is possible to generate data in real-time, which in turn allows for yield calculations in real-time. This calculation is typically needed for formal submissions to regulatory agencies. Typically, this calculation is difficult to perform in real-time. By using the iSKID™, we have demonstrated the readily available yield per unit operation in the periodic stage. An example of the yield measurement for the Anion Exchange step is demonstrated for a full run (FIG. 9).

INDUSTRIAL APPLICABILITY

The device and methods disclosed herein are useful for perfusion biomanufacturing, and thus for improving industrial methods for manufacturing recombinant, therapeutic proteins.

What is claimed is:

1. An automated integrated single-use continuous cell culture system comprising, in the following order:
   a. a single-use perfusion bioreactor (SUB) between 10 L and 2250 L,
   b. a single-use tangential flow filtration system generating a permeate,
   c. a single-use dual-column capture column chromatography skid configured to operate in parallel generating an effluent, wherein the capture column is Protein A;
   d. a tankless hold comprising an elution stream chamber consisting of a tubing and having a volume of 1.1 to 3 times the volume of a single capture column;
   e. a single-use virus inactivation plug flow reactor, wherein the single-use virus inactivation plug flow reactor is a continuous viral inactivation reactor including an inlet, an outlet, and a tubular flow path having a set of alternating turns that form a serpentine pattern between the inlet and the outlet, wherein the tubular flow path includes a diameter of from 0.6 cm to 0.7 cm, and wherein the set of alternating turns are segmented vertically into at least two stacked layers, wherein each of the at least two stacked layers include a thickness of from 0.7 cm to 1.2 cm;
   f. an individual anion-exchange chromatography column;
   g. a single pass tangential flow filtration system;
   h. a single use mixer; and
   i. a first set of pumps operating with a range of about 60 mL/min to about 5 L/min, or about 60 ml/min to about 600 mL/min and a second set of pumps operating with a range of about 125 mL/min to about 2.5 L/min;
   wherein the single-use SUB is fluidically attached, without a tank and by tubing, to the single-use tangential flow filtration system;
   wherein the permeate is transferred, without a tank, by ¼ inch to ⅜ inch single-use tubing to the single-use dual-column capture column chromatography skid;
   wherein the effluent is transferred, without a tank, by single-use ¼ inch to ⅜ inch tubing to the tankless hold;
   wherein the tankless hold is fluidically connected to the single-use virus inactivation plug flow reactor;
   wherein the virus inactivation plug flow reactor is fluidically connected without a tank and by tubing to the anion exchange chromatography column,
   wherein the anion exchange chromatography column is fluidically connected without a tank and by tubing to the single pass tangential flow filtration system, and
   wherein the single pass tangential flow filtration system is fluidically connected without a tank and by tubing to the single use mixer, and wherein the first and second sets of pumps are fluidically connected to one or more of components a-i.

2. The automated integrated single-use continuous cell culture system of claim 1, wherein the system is capable of processing between 10 g and 5,000 g of recombinant protein per day.

* * * * *